US012160049B2

(12) United States Patent
Dawson

(10) Patent No.: US 12,160,049 B2
(45) Date of Patent: Dec. 3, 2024

(54) HYBRID RF BEAMFORMING WITH MULTIPORT ANTENNA WITH PARASITIC ARRAY

(71) Applicant: United States of America as represented by the Secretary of the Navy, San Diego, CA (US)

(72) Inventor: David Carlos Dawson, Lemon Grove, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 430 days.

(21) Appl. No.: 17/685,031

(22) Filed: Mar. 2, 2022

(65) Prior Publication Data

US 2023/0282975 A1 Sep. 7, 2023

(51) Int. Cl.
*H01Q 3/00* (2006.01)
*H01Q 3/26* (2006.01)
(Continued)

(52) U.S. Cl.
CPC ............. *H01Q 3/2611* (2013.01); *H01Q 3/26* (2013.01); *H01Q 3/24* (2013.01); *H01Q 3/36* (2013.01); *H01Q 19/28* (2013.01)

(58) Field of Classification Search
CPC .......... H01Q 3/24; H01Q 3/26; H01Q 3/2611; H01Q 3/446; H01Q 3/36; H01Q 19/28; H01Q 19/32; H01Q 21/00; H01Q 21/20
(Continued)

(56) References Cited

U.S. PATENT DOCUMENTS 5,872,547 A * 2/1999 Martek .................. H01Q 11/08 343/893
6,492,942 B1 * 12/2002 Kezys ...................... H01Q 3/26 342/368
(Continued)

FOREIGN PATENT DOCUMENTS

JP 2006238225 A * 9/2006 ............... H01Q 3/44
JP 2006261941 A * 9/2006 ............... H01Q 3/44

OTHER PUBLICATIONS

Unpublished U.S. Appl. No. 17/210,634, filed Mar. 24, 2021.
(Continued)

*Primary Examiner* — Chuong P Nguyen
(74) *Attorney, Agent, or Firm* — Naval Information Warfare Center, Pacific; Kyle Eppele; J. Eric Anderson

(57) ABSTRACT

A method for hybrid RF beamforming comprising: providing an antenna structure which comprises: a driven element, parasitic elements configured to couple/decouple a linearly polarized radiation pattern and arranged around the driven elements, a feed system comprising four ports that are 90 degrees out of phase with each other and are connected to the driven element, RF switches electrically connected to the parasitic elements and the four ports, and a controller operatively connected to the RF switches; selectively attenuating an output of each of the four ports with the controller according to a stored configuration, which is stored in a memory, by changing the four ports' respective phase or attenuation; and selectively changing a loading of each parasitic element by activating each parasitic element's corresponding RF switch with the controller according to the stored configuration so as to produce a desired null/beamforming of a main RF beam.

20 Claims, 9 Drawing Sheets

(51) Int. Cl.
*H01Q 3/24* (2006.01)
*H01Q 3/36* (2006.01)
*H01Q 19/28* (2006.01)

(58) Field of Classification Search
USPC .................................................. 342/372, 374
See application file for complete search history.

(56) References Cited

U.S. PATENT DOCUMENTS

| | | | | |
|---|---|---|---|---|
| 6,987,493 | B2 * | 1/2006 | Chen | H01Q 3/446 343/893 |
| 8,446,318 | B2 * | 5/2013 | Ali | H01Q 3/24 342/383 |
| 8,842,050 | B2 * | 9/2014 | Livneh | H01Q 21/293 343/702 |
| 11,378,606 | B2 * | 7/2022 | Santoyo-Mejia | H01Q 3/34 |
| 11,417,956 | B2 * | 8/2022 | Lin | H01Q 3/446 |
| 11,563,509 | B2 * | 1/2023 | Dawson | G01S 19/015 |
| 11,581,648 | B2 * | 2/2023 | Murch | H01Q 5/49 |
| 2005/0159187 | A1 * | 7/2005 | Mendolia | G01S 5/12 343/702 |
| 2014/0313080 | A1 * | 10/2014 | Smith | H01Q 19/28 342/368 |
| 2022/0140481 | A1 * | 5/2022 | Lin | H01Q 25/002 343/702 |
| 2022/0311535 | A1 * | 9/2022 | Dawson | G01S 19/21 |

OTHER PUBLICATIONS

Unpublished U.S. Appl. No. 17/375,804, filed Jul. 14, 2021.

T. Ohira, "Adaptive array antenna beamforming architectures as viewed by a microwave circuit designer," 2000 Asia-Pacific Microwave Conference. Proceedings (Cat. No. 00TH8522), 2000, pp. 828-833, doi: 10.1109/APMC.2000.925958 (Dec. 2000).

* cited by examiner

HYBRID RF BEAMFORMING WITH MULTIPORT ANTENNA WITH PARASITIC ARRAY

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 103656.

BACKGROUND OF THE INVENTION

Antenna null forming or beamforming can be achieved using a variety of existing architectures. Examples of prior art architectures are depicted in FIGS. 1A through 1E. The aerial beamforming architecture shown in FIG. 1D has the advantage of requiring only input/output path from a single antenna. However, parallel processing is impossible when using the aerial beamforming architecture because only a single input/output path can be processed at a time.

Digital beamforming antennas, depicted in FIG. 1A, are widely used. Digital beamforming (DBF) are good adaptive antennas, and are supported by a wealth of control algorithms. However, digital beamforming antennas are very expensive because of the multiplicity of paths and subsequent components required in each of their radio frequency (RF) chains. These components typically include transmission lines, amplifiers, filters, analog-to-digital converters, weight circuitry, and other components. Each element requires a dedicated path with a set of components. Similarly, the microwave beamforming (MBF) depicted in FIG. 1B, local beamforming (LBF) depicted in FIG. 1C, and optical beamforming (OBF) depicted in FIG. 1E require additional components for each RF path/chain as well. The single input/output of ABF is simple and inexpensive, but not too capable. The multiple input/output paths of parallel processing is more capable, but complex and expensive. There is a need for an improved method, a compromise between the two, a hybrid RF beamforming.

SUMMARY

Disclosed herein is a method for hybrid RF beamforming comprising the following steps. The first step entails providing an antenna structure which comprises: a driven element, a plurality of parasitic elements, a first plurality of RF switches, a feed system, a second plurality of RF switches, and a controller. The plurality of parasitic elements are arranged around the driven element and each of the plurality of parasitic elements is configured to couple/decouple a linearly polarized radiation pattern. The first plurality of RF switches is electrically connected to the plurality of parasitic elements. The feed system comprises four ports that are 90 degrees out of phase with each other. The four ports are connected to the driven element. The second plurality of RF switches are connected to the four ports. The controller is operatively connected to the first and second pluralities of RF switches. Another step provides for selectively attenuating an output of each of the four ports with the controller according to a stored configuration, which is stored in a memory, by changing the four ports' respective phase or attenuation. Another step provides for selectively changing a loading of each parasitic element by activating each parasitic element's corresponding RF switch with the controller according to the stored configuration so as to produce a desired null/beamforming of a main RF beam.

An embodiment of the hybrid beamforming method is also disclosed herein as comprising the following steps. The first step entails providing an antenna structure that comprises a driven element, a plurality of parasitic elements, first and second pluralities of RF switches, four ports, and a controller. The plurality of parasitic elements are arranged around the driven element, and each of the plurality of parasitic elements is configured to couple/decouple a linearly polarized radiation pattern. The first plurality of RF switches electrically are connected to the plurality of parasitic elements. The four ports, which are 90 degrees out of phase with each other, are configured to feed the driven element. The second plurality of RF switches are connected to the four ports. The controller is operatively connected to the first plurality of RF switches and to the second plurality of RF switches. Another step provides for using the controller to selectively disconnect an one, two or up to three outputs of a given feed port according to a stored configuration, which is stored in a memory, by switching a state of the given feed port's corresponding RF switch, thereby changing the feed ports' respective phase or attenuation. Another step provides for selectively changing a loading of each parasitic element by activating each parasitic element's corresponding RF switch with the controller according to the stored configuration so as to produce a desired null/beamforming of a main RF beam.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and antenna below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and antenna described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1A:
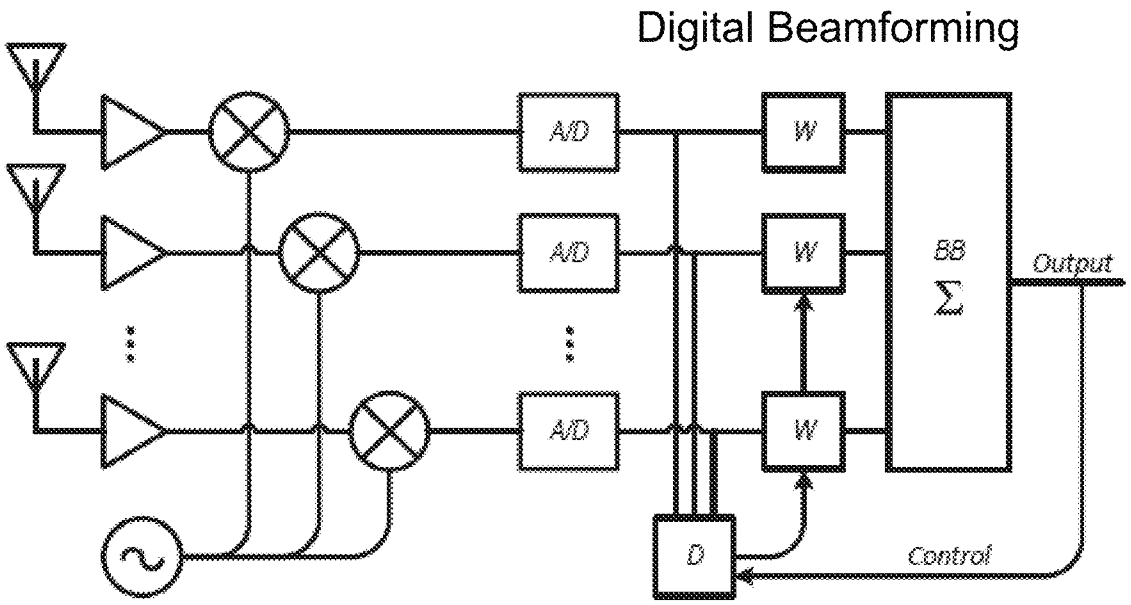
Fig. 1A (PRIOR ART)
FIGS. 1A through 1E are schematics of different prior art adaptive beamforming architectures.
Figure 1B:
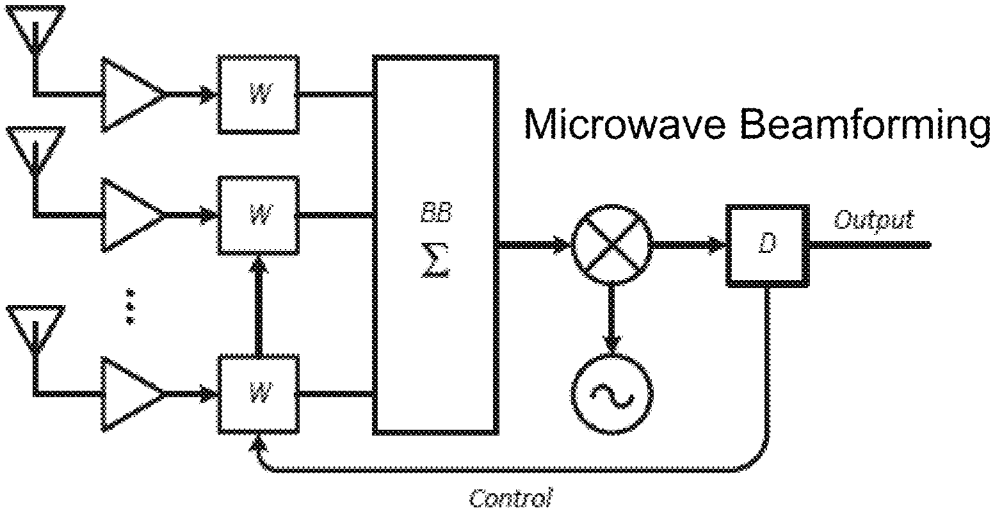
Fig. 1B (PRIOR ART)
Figure 1C:
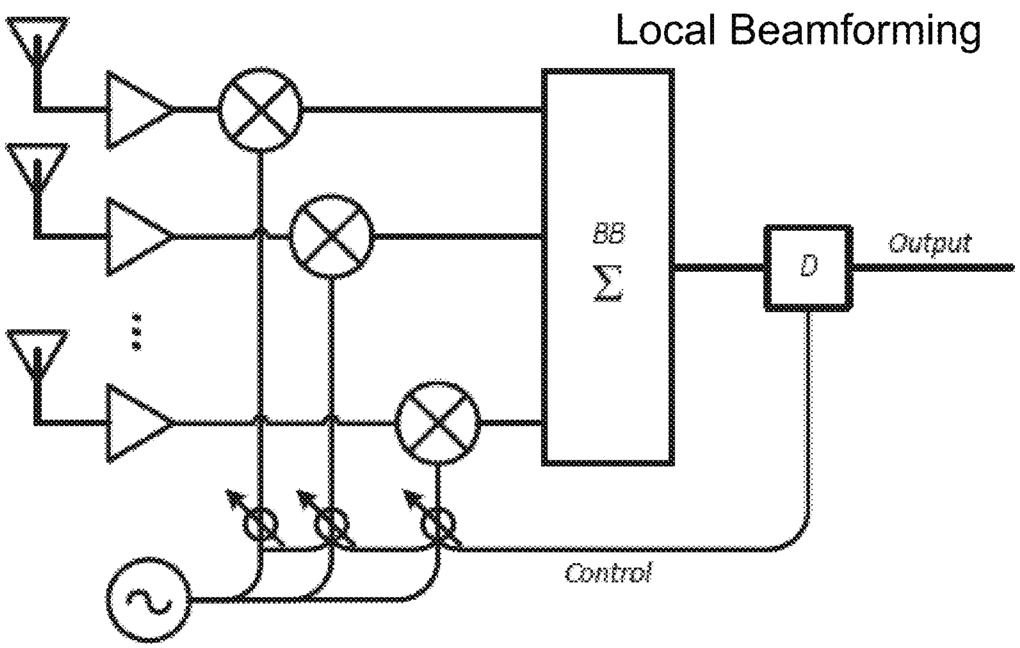
Fig. 1C (PRIOR ART)
Figure 1D:
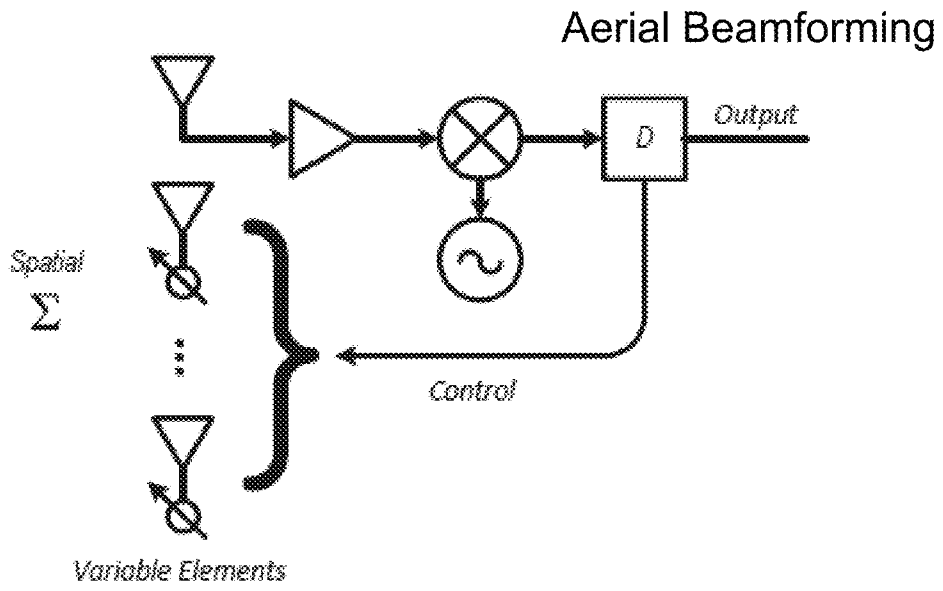
Fig. 1D (PRIOR ART)
Figure 1E:
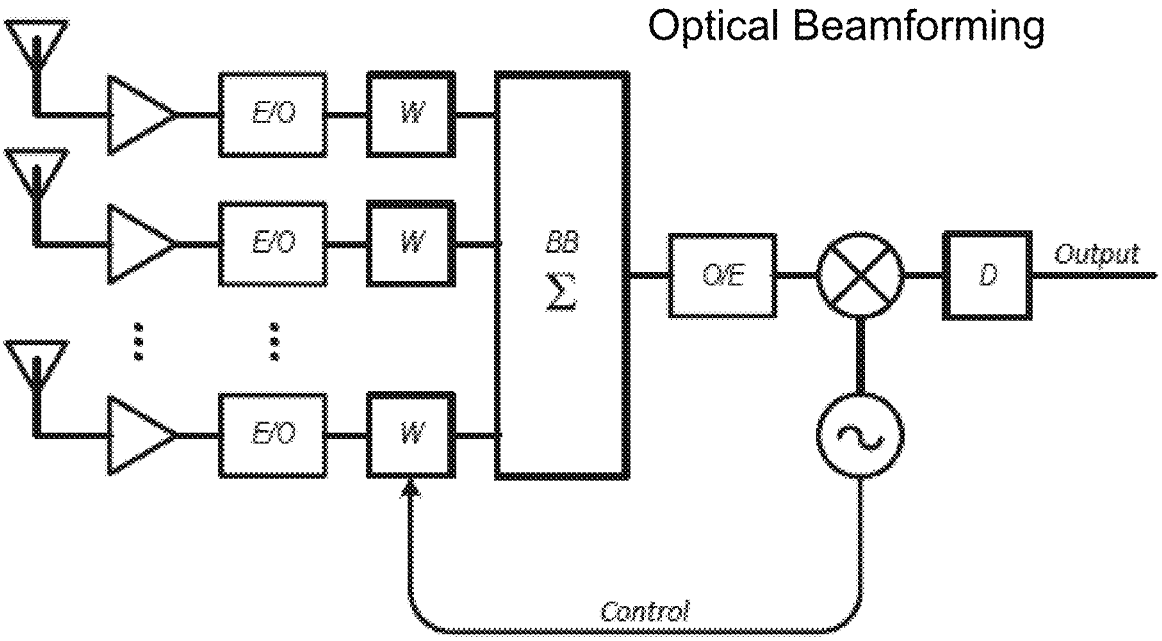
Fig. 1E (PRIOR ART)
Figure 2:
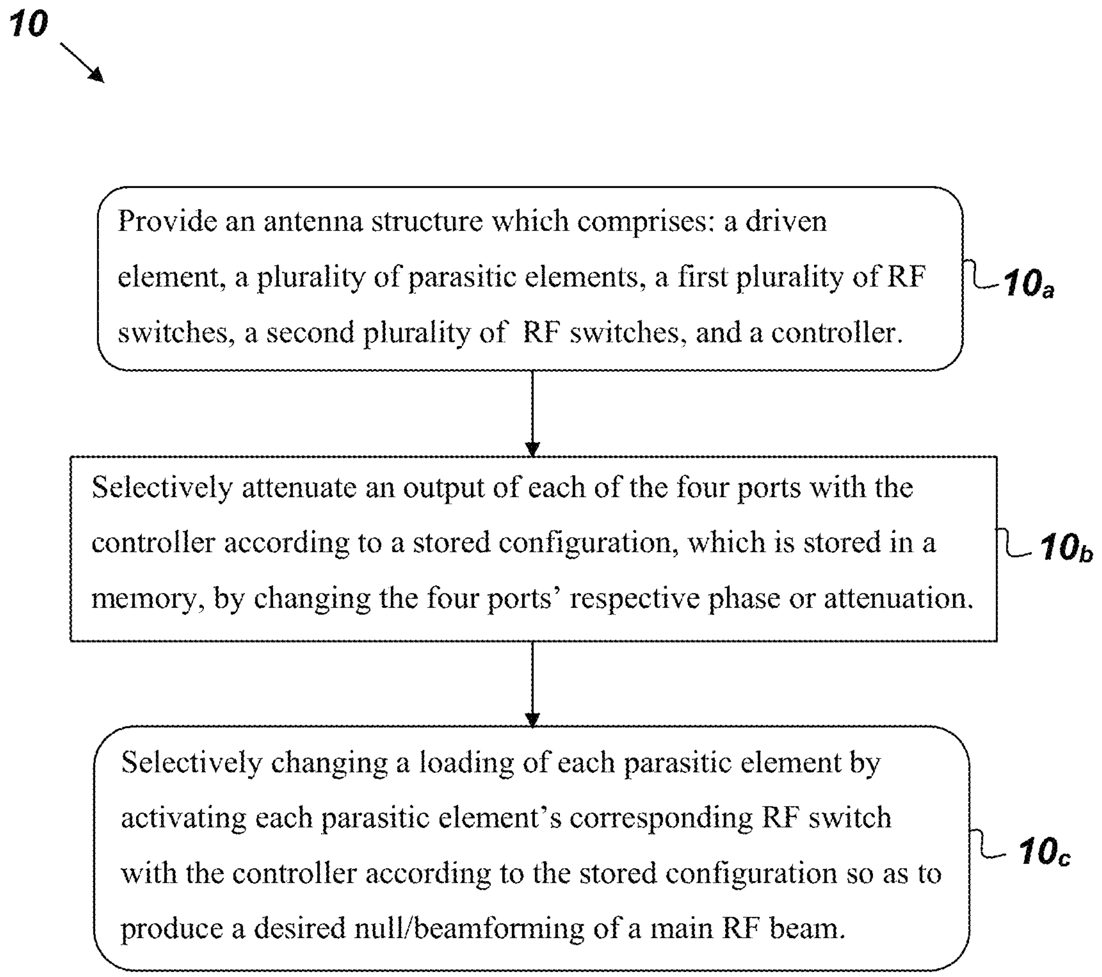
FIG. 2 is a flowchart of a method for hybrid beamforming.
Figure 3:
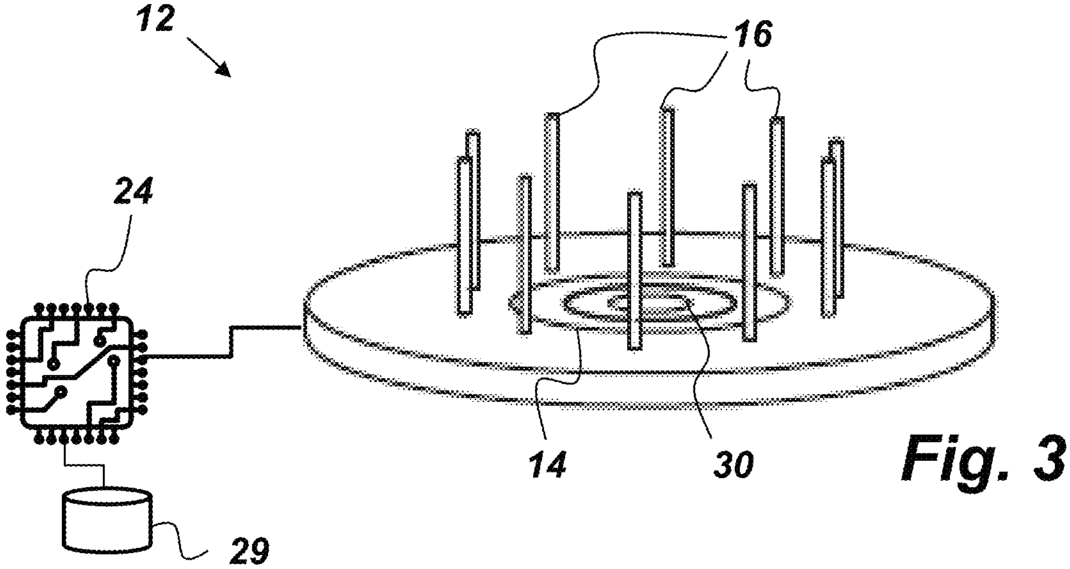
FIG. 3 is a perspective view of an embodiment of an antenna structure.

FIG. 2 is a flowchart of a method 10 for hybrid RF beamforming comprising, consisting of, or consisting essentially of the following steps. The first step $\mathbf{10}_a$ entails providing an antenna structure, such as is depicted in FIG. 3, which comprises: a driven element, a plurality of parasitic elements, a first plurality of RF switches, a feed system, a second plurality of RF switches, and a controller. Another step $\mathbf{10}_b$ provides for selectively attenuating an output of each of the four ports with the controller according to a stored configuration, which is stored in a memory, by changing the four ports' respective phase or attenuation. Another step $\mathbf{10}_c$ provides for selectively changing a loading of each parasitic element by activating each parasitic element's corresponding RF switch with the controller according to the stored configuration so as to produce a desired null/beamforming pattern.

Figure 4:
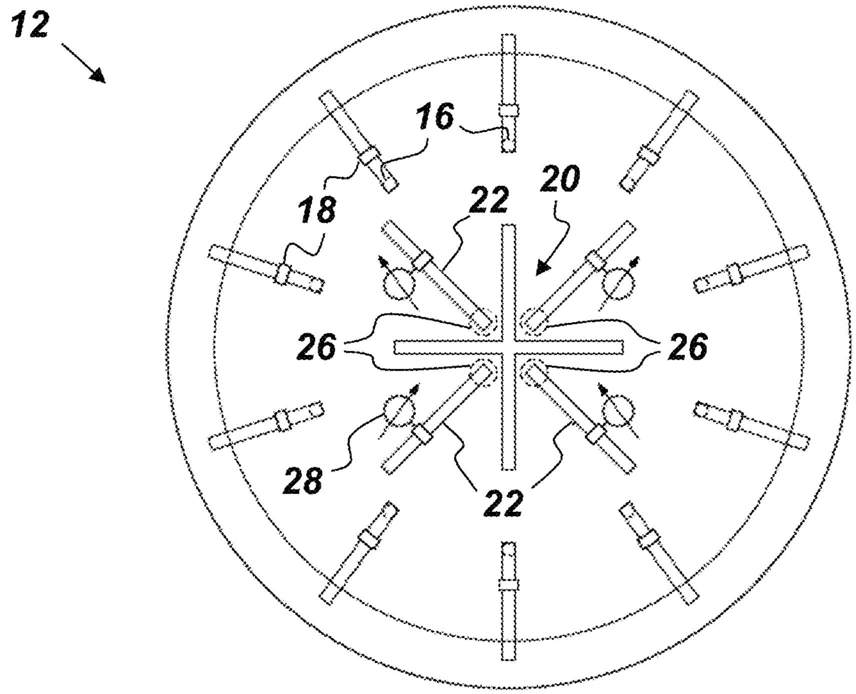
FIG. 4 is a bottom view of an embodiment of an antenna structure.

FIGS. 3 and 4 are respectively perspective-view and bottom-view illustrations of an embodiment of an antenna structure 12, which comprises, consists of, or consists essentially of a driven element 14, a plurality of parasitic elements 16, a first plurality of RF switches 18, a feed system 20, a second plurality of RF switches 22, and a controller 24. The plurality of parasitic elements 16 are arranged around the driven element 14 and each of the plurality of parasitic elements 16 is configured to couple/decouple a linearly polarized radiation pattern. The first plurality of RF switches 18 is electrically connected to the plurality of parasitic elements 16. The feed system 20 comprises four ports 26 that are 90 degrees out of phase with each other. The four ports 26 are connected to the driven element 14. The second plurality of RF switches 22 are connected to the four ports 26. The controller 24 is operatively connected to the first and second pluralities of RF switches 16 and 22 respectively.

One embodiment of the antenna structure 12 may comprise multiple driven elements 14, such as concentric, circular patch antennas. Each driven element 14 may have its own feed port 26, or a driven element 14 may have multiple feed ports 26, such as is shown in FIGS. 3 and 4. The parasitic elements 16 may be arrayed around, or in between the feed ports 26 or driven element(s) 14. All of the driven element ports 26 have means for attenuating their outputs by changing their phase or attenuation. In FIG. 4, each feed port 26 is shown as connected to a phase shifter 28. Additionally, all of the parasitic elements 16 have means (e.g., the RF switches 18) for changing their loading and becoming partially, or fully absorbing or reflecting of RF energy.

The radiation pattern of the antenna structure 12 may be altered due to the loading effect of the driven element 14. This is because the phase and attenuation of two adjacent feed ports 26 can be changed, such that they neutralize/enhance each other. The loading of the parasitic elements 16 is also able to change the radiation pattern by itself. This is because the parasitic elements 16 can absorb or reflect the surviving vertical electric field, not annihilated by the ground plane of driven element 14. The combined effect of both enhances the radiation performance of the antenna structure 12, i.e. enhances the null or beamforming, and aids in the steering, increasing the granularity of the steering. The specific configuration of RF switches 18 and 22 that produce the desired null/beamforming and the steering is known beforehand and can be stored in a memory 29.

The feed ports 26 and the parasitic elements 16 may be activated by the first plurality of RF switches 18 and loading resistor (R), inductor (L), capacitor (C) circuitry, which can be in lumped form or distributed through transmission lines. Transmission lines or phase shifters may be used to shift the phase of the driven element(s) 14. The number of available configuration of null/beamforming is large. If the number of driven elements 14 is N and the number of parasitic elements 16 is P, the number of different radiation pattern configurations is N*2^P. The number of parasitic elements 16 that can be aggregated is arbitrary; however their number must be such that the input impedance of the antenna structure 12 is not critically affected. The parasitic elements 16 can be of any desired size/shape. Suitable examples of the parasitic elements 16 include, but are not limited to, linearly polarized dipoles or monopoles, which tend to be the most effective capturing the linearly polarized electric fields of the antenna structure 12. Other shapes may be more effective in the near-field, depending on the specific vertical or horizontal component of the electric field that's most desired to neutralize. The number of parasitic elements 16 depends on how close they are located to a center of the antenna structure 12, and their effect on the input impedance of the antenna structure 12.

In the embodiment of the antenna structure 12 shown in FIG. 3 and FIG. 4, the driven element 14 surrounds a central pad 30 and an array of monopole parasitic elements 16 surrounds the driven element 14. The first and second pluralities of RF switches 18 and 22 respectively enable lumped or distributed loading of the parasitic elements 16. As shown, each feed port 26 of the feed system 20 is connected to a corresponding RF switch in the second plurality of RF switches 22. The controller 24 is configured to change the loading of the feed system 20 via the corresponding RF switches 22. The feed ports 26 can be attenuated in their outputs by the second plurality of RF switches 22 individually changing the phase or attenuation as well as loading of the individual feed ports 26 of the feed system 20. In this way, the loading effects on the feed ports 26 in the feed system 20 can change the radiation pattern of the antenna structure 12 by changing the loading on the driven element 14.

Figure 5:
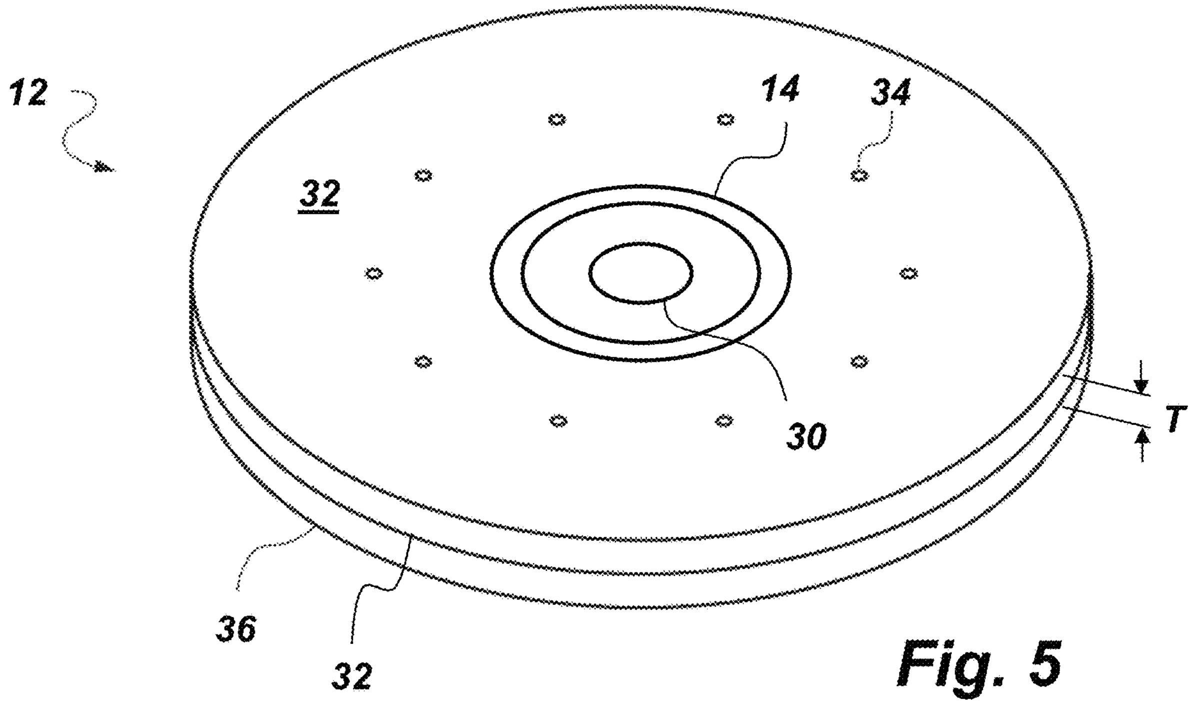
FIG. 5 is a top, perspective view illustration of an embodiment of a portion of an antenna structure.

FIG. 5 is a top, perspective view illustration of an embodiment of a portion of the antenna structure 12. In this embodiment, the antenna structure 12 includes a dielectric member 32 with a plurality of parasitic member holes 34 formed there-through. The thickness T of the dielectric member 32 is chosen according to the desired bandwidth and gain of the antenna structure 12. A driven element 14 is placed on top of the dielectric member 32 and electrically connected to a ground plane 36, upon which the dielectric member 32 is disposed. In this embodiment, the driven element 14 is a circular patch antenna that is concentrically arranged with the dielectric member 32 and the ground plane 36; and the parasitic member holes 34 are evenly and circularly arranged around the driven element 14.

Figure 6:
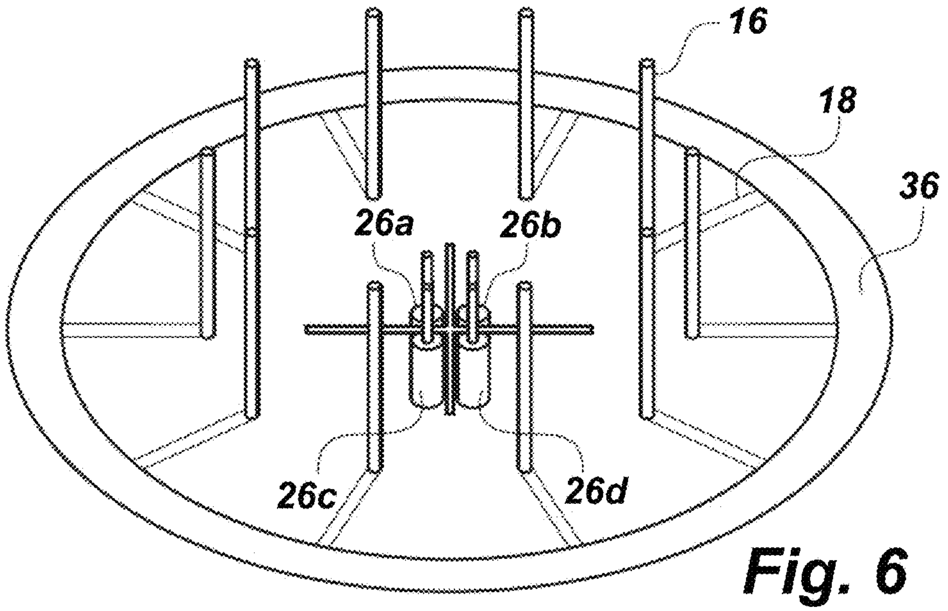
FIG. 6 is a perspective-view illustration of a feed system.

FIG. 6 is a perspective view illustration of the feed system 20. In this embodiment, the feed system 20 comprises four feed ports 26*a*, 26*b*, 26*c*, and 26*d*. The parasitic elements 16 are arranged to coincide with the number and arrangement of parasitic member holes 34. In this embodiment, the parasitic elements 16 extend orthogonally away from the ground plane 36 and driven element 14. The first plurality of RF switches 18 connect the parasitic elements 16 to the ground plane 36. The controller 24 can selectively open or close the RF switched 18 to selectively ground individual parasitic elements 16. In this embodiment, each parasitic element 16 corresponds to one of the plurality of RF switches 18. An RF combiner may be used to combine the four feed ports 26 into a single port.

Figure 7:
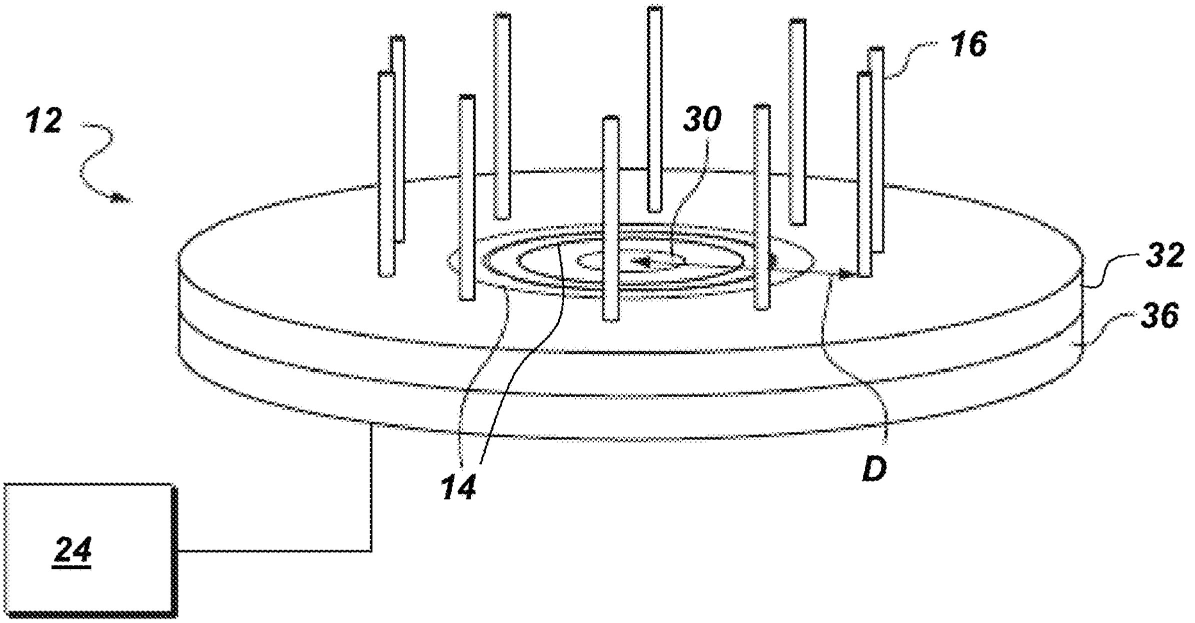
FIG. 7 is a perspective-view illustration of an embodiment of an antenna structure having multiple driven elements.

FIG. 7 is a perspective-view illustration of an embodiment of the antenna structure 12 having multiple driven elements 14. Each parasitic element 16 is received in a corresponding parasitic member hole 34 formed through the dielectric member 32. The dielectric member 32 is in contact with the ground plane 36. The parasitic elements 16 are arranged concentrically around the central pad 30 at a separation distance D. The separation distance D is less than $\lambda/4$, where $\lambda$ is the effective design wavelength for the antenna structure 12. Because of this separation distance D, no reactive loading is required for this embodiment of the antenna structure 12, and so no capacitors and inductors are required for the RF switches 18 for the parasitic elements 16. The controller 24 is configured to selectively open and close the RF switches 18 in order to form radiation pattern nulls in a desired direction. Combinations of open and closed RF switches 18 can generate nulls in particular/desired directions.

Figure 8:
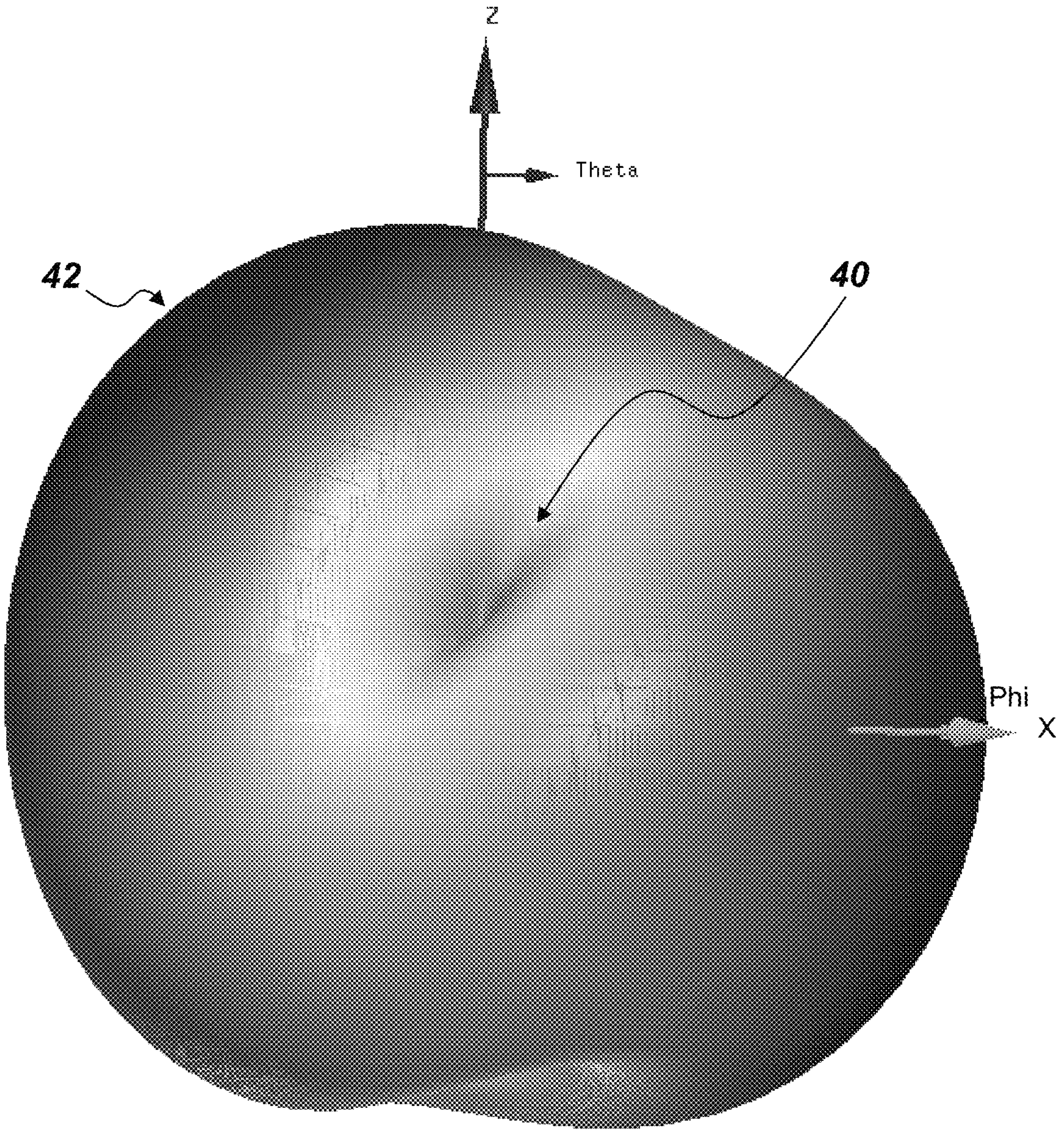
FIG. 8 is an illustration of a radiation pattern.

FIG. 8 is an illustration of a radiation pattern that may be generated by the antenna structure 12 as a result of practicing steps of an embodiment of the hybrid beamforming method 10 wherein only some of the parasitic elements 16 are activated. In other words, FIG. 8 describes the radiation pattern of the antenna 12 under a specific parasitic loading configuration. As shown in FIG. 8, an inclined null 40 is formed facing the reader while a beam 42 is formed pointing into the upper left of the page.

Figure 9:
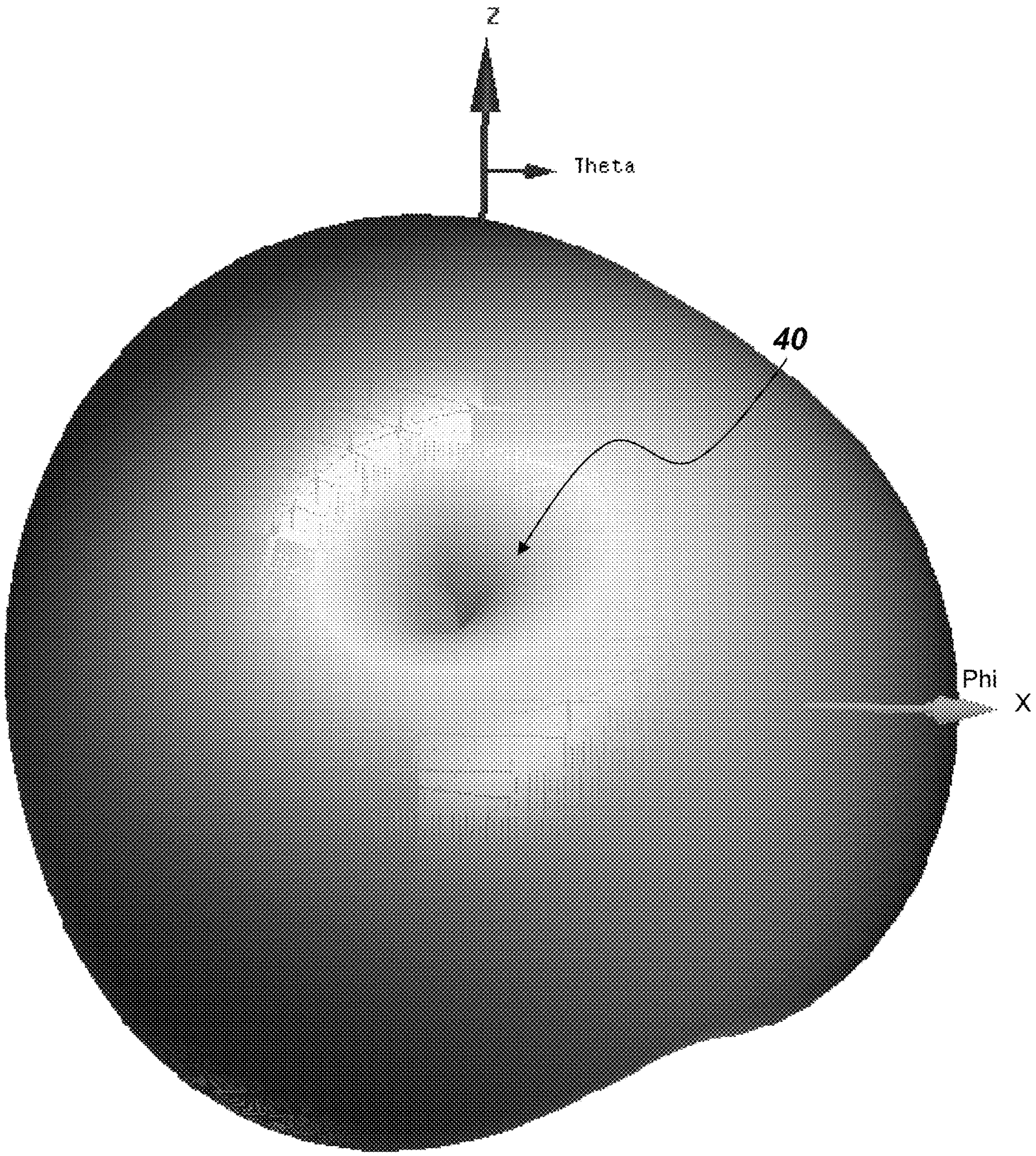
FIG. 9 is an illustration of a radiation pattern.

FIG. 9 shows another radiation pattern generated by the same antenna structure 12 as used to generate the pattern shown in FIG. 8 but with a given feed port 26 phase-shifted by 90 degrees. The null 40 changes shape and it is deeper for a more controlled shape of the radiation pattern. Many other configurations (N*2^P) can be produced, with a single or with multiple nulls, according to the hybrid beamforming method 10 as desired.

The antenna structure 12 may be controlled by the controller 24, which may be a radio or an intermediate control mechanism that activates the RF switches 18 and 22 for the parasitic elements 16 and the feed ports 20 respectively. This controller 24 may use a combination of software and algorithms to control the RF switches 18 and 22 to produce the desired null/beamforming according to a predetermined setting stored in the memory 29. Because the antenna structure 12 can be used with all kinds of processing, the electronics supporting the operation of the antenna structure 12 can be a combination of known antenna-supporting electronics.

Antenna structure 12 and method 10 allow for radiation pattern beamforming or null-forming of otherwise non-steerable, single beam antennas in specific directions. Sharp nulls, such as depicted in FIGS. 8 and 9, can be created that effectively make the antenna structure 12 "deaf" in a chosen noisy direction, thus avoiding interference from unintended users, co-sited radios or other sources of interference. The hybrid architecture of antenna structure 10 allows for effective parallel processing of multiple signals from different driven elements/ports, while the use of parasitic elements can be employed to adapt, or further refine an already adapted radiation pattern. The antenna structure 12 may be used in conjunction with a large variety of control algorithms. In addition to being useful for single beamforming processes, the antenna structure 12 enables hybrid beamforming solutions. For example, standard beamforming algorithms, such as DBF, MBF, LBF, or OBF processing, may be employed in conjunction with the ABF algorithm all on the same embodiment of the antenna structure 12. For instance, direction of arrival (DOA) algorithms, widely used in DBF and abundant in the literature, can be used to quickly ascertain the direction in which the antenna structure 12 should place a beam or a null and the parasitic elements 16 can be used to further refine the width and the elevation of the null using OBF algorithms.

From the above description of the method 10 and the antenna structure 12, it is manifest that various techniques may be used for implementing the concepts of method 10 and the antenna structure 12 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 and the antenna structure 12 is not limited to the particular embodiments described herein, but is capable of many embodiments without departing from the scope of the claims.

I claim:

1. A method for hybrid radio frequency (RF) beamforming comprising:
- providing an antenna structure which comprises:
  - a driven element,
  - a plurality of parasitic elements arranged around the driven element, wherein each of the plurality of parasitic elements is configured to couple/decouple a linearly polarized radiation pattern,
  - a first plurality of RF switches electrically connected to the plurality of parasitic elements,
  - a feed system comprising four ports that are 90 degrees out of phase with each other, wherein the four ports are connected to the driven element,
  - a second plurality of RF switches connected to the four ports, and
  - a controller operatively connected to the first and second pluralities of RF switches;
- selectively attenuating an output of each of the four ports with the controller according to a stored configuration of the first and second pluralities of RF switches, which is stored in a memory, by changing the four ports' respective phase or attenuation; and
- selectively changing a loading of each parasitic element by activating each parasitic element's corresponding RF switch with the controller according to the stored configuration so as to produce a desired null/beamforming of a main RF beam.

2. The method of claim 1, wherein each parasitic element is orthogonal to a ground plane.

3. The method of claim 2, wherein each parasitic element is spaced a separation distance from the driven element, wherein the first separation distance is less than λ/2, wherein λ is a design wavelength of the antenna structure.

4. The method of claim 3, wherein the parasitic elements are arranged concentrically around the driven element.

5. The method of claim 1, wherein the stored configuration results in a sharp null in the radiation pattern in a desired direction so as to avoid interference from a co-site emitter.

6. The method of claim 1, wherein the stored configuration results in enhanced radiation in a particular direction.

7. The method of claim 1, wherein the stored configuration results in both a sharp null in the radiation pattern in a desired direction and in enhanced radiation in a particular direction.

8. The method of claim 1, further comprising the step of performing aerial beamforming (ABF) processing, digital beamforming (DBF) processing, microwave beamforming (MBF) processing, local beamforming (LBF) processing, and optical beamforming (OBF) processing with the antenna structure.

9. The method of claim 1, further comprising the step of using the antenna structure to perform aerial beamforming (ABF) processing in conjunction with an additional beamforming process selected from the group consisting of: digital beamforming (DBF) processing, microwave beamforming (MBF) processing, local beamforming (LBF) processing, and optical beamforming (OBF) processing.

10. The method of claim 1, further comprising:

using an RF combiner to combine the four ports into a single port.

11. A method for hybrid radio frequency (RF) beamforming comprising:

providing an antenna structure which comprises:

a driven element, a plurality of parasitic elements arranged around the driven element, wherein each of the plurality of parasitic elements is configured to couple/decouple a linearly polarized radiation pattern, a first plurality of RF switches electrically connected to the plurality of parasitic elements, four ports that are 90 degrees out of phase with each other, wherein the four ports are configured to feed the driven element, a second plurality of RF switches connected to the four ports, and a controller operatively connected to the first plurality of RF switches and to the second plurality of RF switches;

using the controller to selectively disconnect an output of a given feed port according to a stored configuration of the first and second pluralities of RF switches, which is stored in a memory, by switching a state of the given feed port's corresponding RF switch, thereby changing the feed ports' respective phase or attenuation; and selectively changing a loading of each parasitic element by activating each parasitic element's corresponding RF switch with the controller according to the stored configuration so as to produce a desired null/beamforming of a main RF beam.

12. The method of claim 11, further comprising changing a radiation pattern of the antenna structure by disconnecting up to three feed ports.

13. The method of claim 12, wherein each parasitic element is orthogonal to a ground plane.

14. The method of claim 13, wherein each parasitic element is spaced a separation distance from the driven element, wherein the first separation distance is less than λ/2, wherein λ is a design wavelength of the antenna structure.

15. The method of claim 14, wherein the parasitic elements are arranged concentrically around the driven elements.

16. The method of claim 11, wherein the stored configuration results in a sharp null in the radiation pattern in a desired direction so as to avoid interference from a co-site emitter.

17. The method of claim 11, wherein the stored configuration results in at least two nulls in different directions in the radiation pattern.

18. The method of claim 11, further comprising the step of performing aerial beamforming (ABF) processing, digital beamforming (DBF) processing, microwave beamforming (MBF) processing, local beamforming (LBF) processing, and optical beamforming (OBF) processing with the antenna structure.

19. The method of claim 11, further comprising the step of using the antenna structure to perform aerial beamforming (ABF) processing in conjunction with an additional beamforming process selected from the group consisting of: digital beamforming (DBF) processing, microwave beamforming (MBF) processing, local beamforming (LBF) processing, and optical beamforming (OBF) processing.

20. The method of claim 11, further comprising:

processing multiple signal inputs from the four ports in parallel with the controller to generate an adapted radiation pattern; and using the parasitic elements to further refine the adapted radiation pattern to generate a refined radiation pattern.

* * * * *